United States Patent
Oron et al.

(10) Patent No.: US 12,400,458 B1
(45) Date of Patent: Aug. 26, 2025

(54) MULTI-CAMERA TOP VIEW OBJECT DETECTION AND SUPPRESSION

(71) Applicant: GM GLOBAL TECHNOLOGY OPERATIONS LLC, Detroit, MI (US)

(72) Inventors: Shaul Oron, Rehovot (IL); Tzach Ashkenazi, Petach Tikva (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/761,792

(22) Filed: Jul. 2, 2024

(51) Int. Cl.
  *G06T 7/80* (2017.01)
  *G06T 7/62* (2017.01)
  *G06V 20/58* (2022.01)

(52) U.S. Cl.
  CPC .......... *G06V 20/58* (2022.01); *G06T 7/62* (2017.01); *G06T 7/80* (2017.01); *G06V 2201/07* (2022.01)

(58) Field of Classification Search
  None
  See application file for complete search history.

(56) References Cited

U.S. PATENT DOCUMENTS

| | | | |
|---|---|---|---|
| 2024/0005632 A1* | 1/2024 | Ko | G06T 7/70 |
| 2024/0242337 A1* | 7/2024 | Holzer | G06V 20/647 |
| 2024/0355041 A1* | 10/2024 | Sabo | G06T 5/70 |

* cited by examiner

*Primary Examiner* — Samuel D Fereja
(74) *Attorney, Agent, or Firm* — Quinn IP Law

(57) ABSTRACT

A system and method for multi-camera vehicle top view object detection that includes capturing and sending video streams of a surrounding environment to a controller from multiple outward looking cameras that include each camera's detecting three-dimensional objects that are associated with that camera's coordinate frame, where one field of view partially overlaps another field of view. Each detected three-dimensional object from the outward looking cameras are transformed and projected onto a two-dimensional coordinate frame and image frame of each camera where a ranked two-dimensional affinity score between each of a pair of detected objects from the cameras are computed where if the affinity score for any object in each of the pair of detected objects is greater than a threshold amount, that object is removed from a list of ranked detected objects and an updated list of ranked detected objects is generated.

20 Claims, 4 Drawing Sheets

MULTI-CAMERA TOP VIEW OBJECT DETECTION AND SUPPRESSION

INTRODUCTION

Vehicles are a staple of everyday life. Special use cameras, microcontrollers, laser technologies, and sensors may be used in many different applications in a vehicle. Cameras, microcontrollers, and sensors may be utilized in enhancing automated structures that offer state-of-the-art experience and services to the customers, for example in tasks such as body control, camera vision, information display, security, autonomous controls, etc. Further, functions utilizing multiple image sensors may be used in situations to detect and react to objects, such as pedestrians and other vehicles, which may have a bearing on the operation of a vehicle.

Vehicles may use multiple cameras, sometimes referred to as top view, or bird's eye view, which may produce a 360-degree overhead perspective of the vehicle and the area surrounding the vehicle, including possible obstructions and obstacles. Such a perspective may assist the driver in various maneuvers such as parking or navigating around different objects. In addition, cameras may be used to detect objects and initiate evasive maneuvers if appropriate. However, cameras may produce ambiguity in their detection, for example whether an object is small and close to the vehicle, or large and far from the vehicle. Such ambiguity may lead to false detections and subsequent inappropriate reactions. Accordingly, it is desirable to provide multi-camera top view object detection with suppression of undesirable image data.

SUMMARY

Disclosed herein are systems and methods for multi-camera vehicle top view object detection that include a first outward looking camera, situated in a vehicle, configured to capture and send a first video stream of a first field of view of a surrounding environment to a controller, where the controller, based on the first video stream, may detect one or more three-dimensional objects within the first field of view and where the first outward looking camera may also be associated with a first camera coordinate frame. The system may include a second outward looking camera, situated in the vehicle, to capture and send a second video stream of a second field of view of a surrounding environment to the controller, where the controller, based on the second video stream, may detect one or more three-dimensional objects within the second field of view and where the second outward looking camera may also be associated with a second camera coordinate frame. Further, the second field of view may partially overlap the first field of view. The controller may also, for the first camera, transform and project each detected three-dimensional object from the first outward looking camera and each detected three-dimensional object from the second outward looking camera, onto a two-dimensional coordinate frame of the first camera and an image plane of the first camera. The controller may also, for the second camera, transform and project each detected three-dimensional object from the first outward looking camera and each detected three-dimensional object from the second outward looking camera, onto a two-dimensional coordinate frame of the second camera and an image plane of the second camera. Then, the controller may, for the projected objects to the image plane of the first outward looking camera, compute a two-dimensional affinity score between each of a pair of detected objects from the first outward looking camera and the second outward looking camera, where if the affinity score for any object in each of the pair of detected objects is greater than a threshold amount, that object may be removed from a list of ranked detected objects. Further, the controller may, for the projected objects to the image plane of the second outward looking camera, compute a two-dimensional affinity score between each of a pair of detected objects from the first outward looking camera and the second outward looking camera, where if the affinity score for any object in each of the pair of detected objects is greater than a threshold amount, that object may be removed from a list of ranked detected objects. And, the controller may also output the list of updated ranked detected objects.

Another aspect of the disclosure may be a system where the two-dimensional affinity score is based on an intersection over union process.

Another aspect of the disclosure may be a system where if the second outward looking camera fails to detect a three-dimensional object by the first outward looking camera, then the controller may not compute a two-dimensional affinity score.

Another aspect of the disclosure may be a system where the two-dimensional affinity score may be based upon a distance and size difference between each pair of detected objects.

Another aspect of the disclosure may be a system where the controller may transform each detected three-dimensional object from the first outward looking camera, onto the two-dimensional coordinate frame of the first camera based on an extrinsic matrix of the first outward looking camera.

Another aspect of the disclosure may be a system where the controller may transform each detected three-dimensional object from the second outward looking camera, onto the two-dimensional coordinate frame of the second camera based on an extrinsic matrix of the second outward looking camera.

Another aspect of the disclosure may be a system where the controller may project each detected three-dimensional object from the first outward looking camera onto the image plane of the first camera based on an intrinsic matrix of the first outward looking camera.

Another aspect of the disclosure may be a system where the controller may project each detected three-dimensional object from the second outward looking camera onto the image plane of the second camera based on an intrinsic matrix of the second outward looking camera.

Another aspect of the disclosure may be a system where computing a two-dimensional affinity score may be based upon the use of a greedy algorithm.

Another aspect of the disclosure may be a system where the detected object may be removed from the list of ranked detected objects based on a non-maximum suppression method.

Another aspect of the disclosure may include a method for multi-camera vehicle top view object detection. The method may include capturing and sending a first video stream of a first field of view of a surrounding environment to a controller from a first outward looking camera, situated in a vehicle. The method may also include detecting, based on the first video stream, one or more three-dimensional objects within the first field of view, where the first outward looking camera may be associated with a first camera coordinate frame. The method may also include capturing and sending a second video stream of a second field of view of a surrounding environment to a controller from a second outward looking camera, situated in the vehicle and then detecting, based on the second video stream, one or more three-dimensional objects within the second field of view, where the second outward looking camera may be associated with a second camera coordinate frame, and where the second field of view partially overlaps the first field of view. The method may then include transforming and projecting each detected three-dimensional object from the first outward looking camera and each detected three-dimensional object from the second outward looking camera onto a two-dimensional coordinate frame of the first camera and an image plane of the first camera. The method may also include transforming and projecting each detected three-dimensional object from the first outward looking camera and each detected three-dimensional object from the second outward looking camera onto a two-dimensional coordinate frame of the second camera and an image plane of the second camera. The method may then include computing, for the projected objects to the image plane of the first outward looking camera, a two-dimensional affinity score between each of a pair of detected objects from the first outward looking camera and the second outward looking camera, where if the affinity score for any object in each of the pair of detected objects is greater than a threshold amount, that object may be removed from a list of ranked detected objects. The method may further include computing, for the projected objects to the image plane of the second outward looking camera, a two-dimensional affinity score between each of a pair of detected objects from the first outward looking camera and the second outward looking camera, where if the affinity score for any object in each of the pair of detected objects is greater than a threshold amount, that object may be removed from the list of ranked detected objects. The method may then include outputting the list of updated ranked detected objects.

Another aspect of the method may include where the computing of the two-dimensional affinity score may be based on an intersection over union process.

Another aspect of the method may include ceasing to compute a two-dimensional affinity score for a detected particular three-dimensional object from the first outward looking camera if the second outward looking camera fails to detect the particular three-dimensional object.

Another aspect of the method may include where the computing of the two-dimensional affinity score is based upon a distance and size difference between each pair of detected objects.

Another aspect of the method may include where the transforming of each detected three-dimensional object from the first outward looking camera, onto the two-dimensional coordinate frame of the first camera is based on an extrinsic matrix of the first outward looking camera.

Another aspect of the method may include where the transforming of each detected three-dimensional object from the second outward looking camera, onto the two-dimensional coordinate frame of the second camera is based on an extrinsic matrix of the second outward looking camera.

Another aspect of the method may include where the projecting of each detected three-dimensional object from the first outward looking camera, onto the image plane of the first camera is based on an intrinsic matrix of the first outward looking camera.

Another aspect of the method may include where the projecting of each detected three-dimensional object from the second outward looking camera, onto the image plane of the second camera is based on an intrinsic matrix of the second outward looking camera.

Another aspect of the method may include where the removing of the detected object is removed from the list of ranked detected objects based on a non-maximum suppression method.

Another aspect of the disclosure may include a method for multi-camera vehicle top view object detection that may include capturing and sending a first video stream of a first field of view of a surrounding environment to a controller from a first outward looking camera, situated in a vehicle. The method may also include detecting, based on the first video stream, one or more three-dimensional objects within the first field of view, wherein the first outward looking camera is associated with a first camera coordinate frame. The method may continue by capturing and sending a second video stream of a second field of view of a surrounding environment to a controller from a second outward looking camera, situated in the vehicle and then by detecting, based on the second video stream, one or more three-dimensional objects within the second field of view, wherein the second outward looking camera is associated with a second camera coordinate frame, and wherein the second field of view partially overlaps the first field of view. The method my include transforming, based on an extrinsic matrix of the first outward looking camera, and projecting, based on an intrinsic matrix of the first outward looking camera, each detected three-dimensional object from the first outward looking camera and each detected three-dimensional object from the second outward looking camera onto a two-dimensional coordinate frame of the first outward looking camera and an image plane of the first outward looking camera. The method may also include transforming, based on an extrinsic matrix of the second outward looking camera, and projecting, based on an intrinsic matrix of the second outward looking camera, each detected three-dimensional object from the first outward looking camera and the second outward looking camera onto a two-dimensional coordinate frame of the second camera and an image plane of the second camera. The method may include computing, for the projected objects to the image plane of the first outward looking camera, a two-dimensional affinity score, based on an intersection over union process, between each of a pair of detected objects from the first outward looking camera and the second outward looking camera, wherein if the affinity score for any object in each of the pair of detected objects is greater than a threshold amount, that object is removed, based on a non-maximum suppression method, from a list of ranked detected objects. The method may include computing, for the projected objects to the image plane of the second outward looking camera, a two-dimensional affinity score, based on an intersection over union process, between each of a pair of detected objects from the first outward looking camera and the second outward looking camera, wherein if the affinity score for any object in each of the pair of detected objects is greater than a threshold amount, that object is removed, based on a non-maximum suppression method, from the list of ranked detected objects. The method may conclude by outputting the list of updated ranked detected objects.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
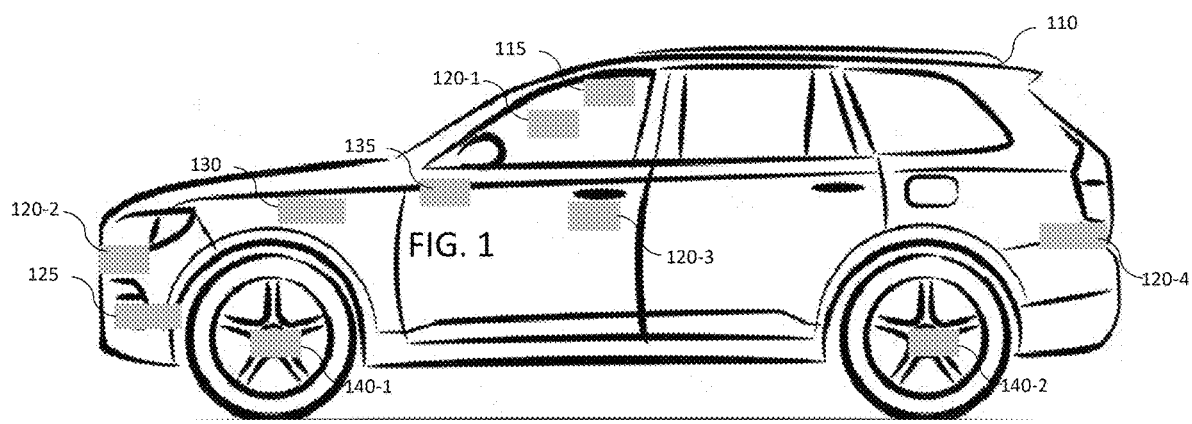
FIG. 1 is an illustration of a variety of possible vehicle sensors, in accordance with the disclosure.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
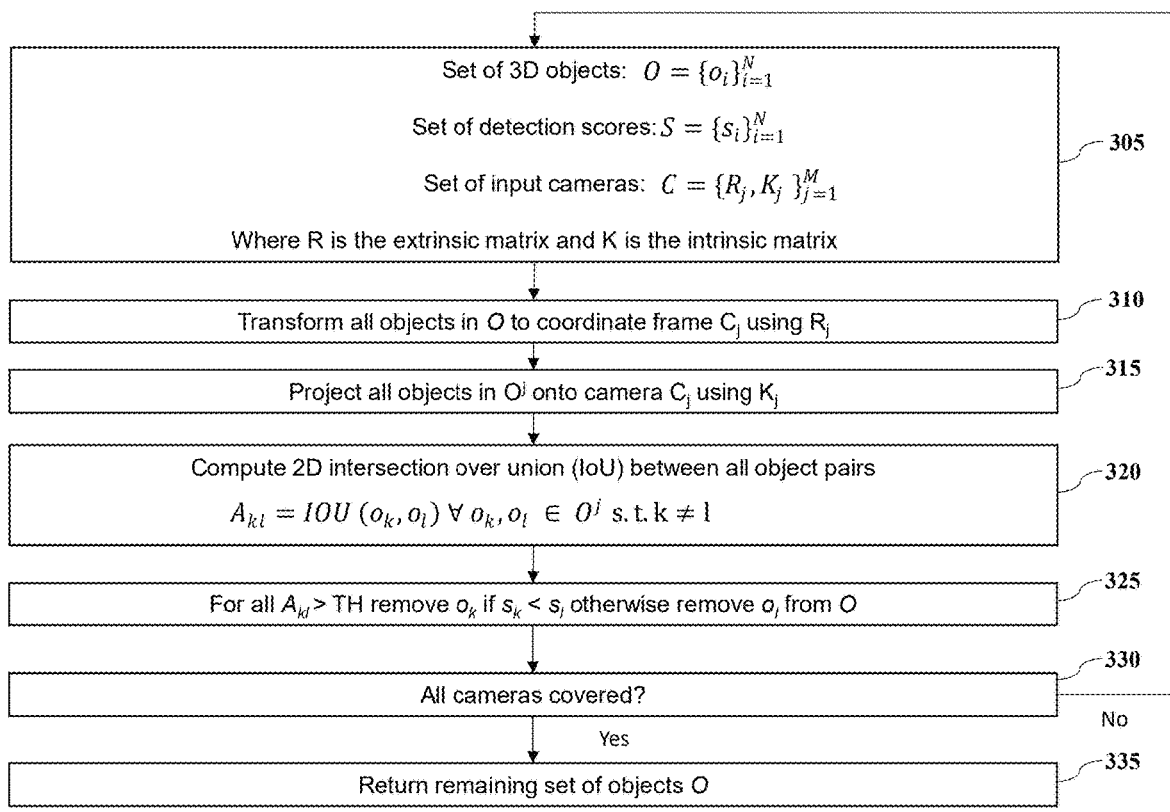
FIG. 3 is a decision flowchart of a method for multi-camera vehicle top view object detection, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, cameras, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and automatic braking that may depend on information obtained from cameras and sensors on a vehicle. Such information may be combined and utilized to limit false object detections while improving line-of-sight detection.

FIG. 1 is an illustration of a vehicle with integrated sensors 100, according to an embodiment of the present disclosure. Such sensors may assist in the use of automated functions, such as autonomous driving and, as discussed, the ability to initiate an automated vehicle action. For example, vehicle 110 may include a Light Detection And Ranging (Lidar) sensor 115, an inward or outward camera sensor 120 (as shown by camera sensor 120-1-120-4), an ultrasonic sensor 125, an inertial measurement unit (IMU) sensor 130, a steering angle sensor 135, and wheel speed sensors 140-1 and 140-2, to name a few. Camera sensor 120 may also include multiple camera sensors placed around and throughout the vehicle, for example, camera sensor 120-1 mounted by the windshield facing forward, camera sensor 120-2 located at the front of the vehicle, facing forward, camera sensor 120-3 located at the left-side of the vehicle (with another side mounted camera sensor located at the right-side of the vehicle (not shown)), and camera-sensor 120-4 located at the rear of the vehicle. Other additional cameras and sensors at other locations may also be possible to provide additional views and/or operations.

Images from camera sensors 120 may be combined into a detection network to generate a 360-degree overhead perspective of the vehicle and the area surrounding the vehicle. Such a top view, or bird's eye view, may be used to capture images and produce a video stream, each with its own field of view. A controller may then be used to incorporate or stitch an image from each of the cameras together to produce the overhead perspective. Such images, or image streams, may then be used to detect objects where such objects may actually be viewed and detected by multiple camera sensors where a field of view of one or the camera sensors may overlap the field of view of another camera sensor. A method of object detection, in some embodiments, may use a single camera sensor to detect a three-dimensional image of an object. However, detection of three-dimensional objects may provide false triggers, for example, confusion between whether the object is close by and relatively small or rather that of a large object that is farther away. For example, comparing the image of a pedestrian from twenty feet versus a semi-truck trailer from one-hundred feet-optically these objects may present a similar size image to the camera sensor.

Figure 2:
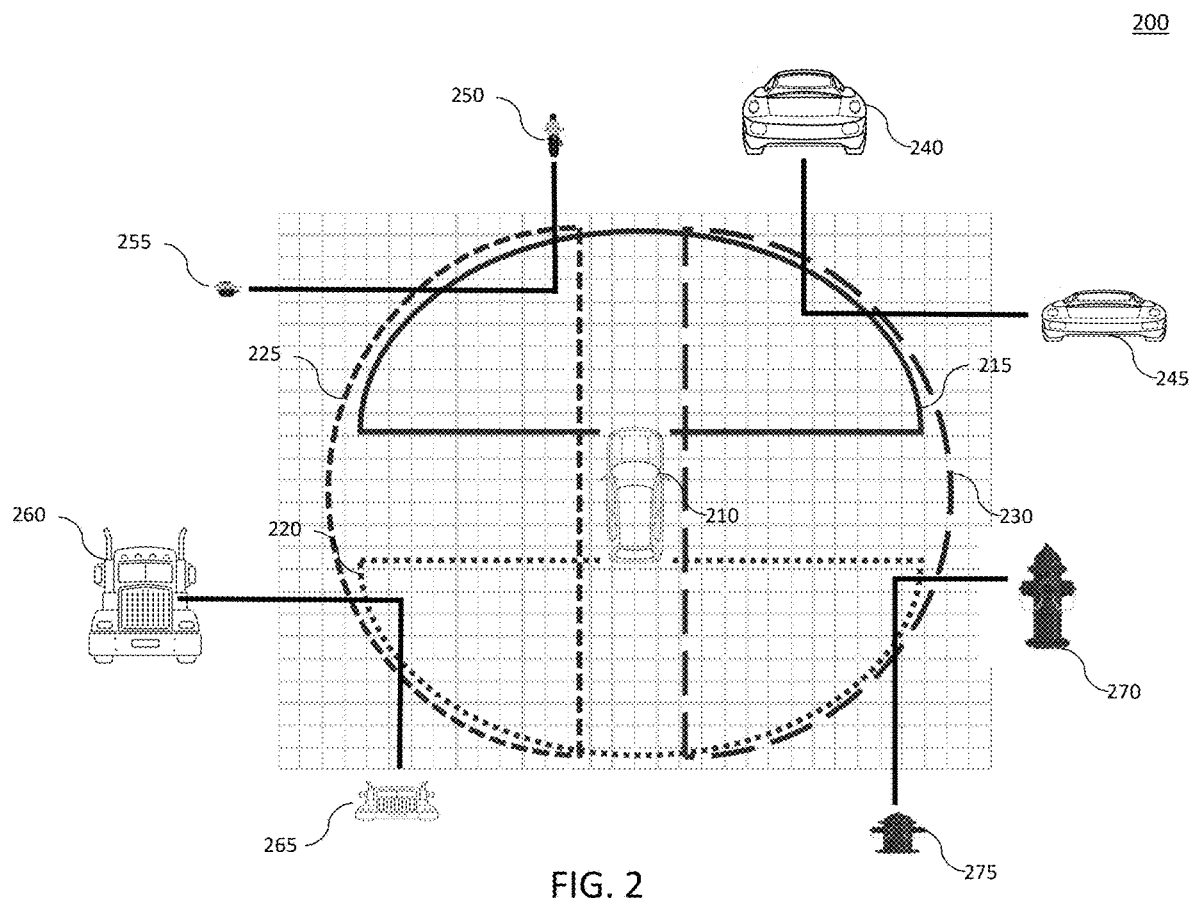
FIG. 2 is an illustration of a camera projection to top-view grid, in accordance with the disclosure.

FIG. 2 is an illustration of a camera projection of a top-view grid 200, according to an embodiment of the present disclosure. FIG. 2 may include a reference vehicle 210 in which multiple cameras, for example, the camera sensors 120 discussed in FIG. 1 that may be placed at multiple positions throughout vehicle 210. Cameras or camera sensors are not meant to convey or restrict the type of camera or imaging devices described herein and may include such other devices as an infrared camera, a Lidar sensor, or other type of imaging device as would be known by one of ordinary skill in the art.

In the example shown in FIG. 2, four camera sensors are utilized as depicted by four fields of view, specifically field of view 215 from a first camera facing forward, where the first camera may be situated within vehicle 210. Field of view 220 may be from a second camera facing backwards, also situated within vehicle 210. Side cameras, such as a third camera with a field of view 225 to the left of vehicle 210 and from a fourth camera with a field of view 230 to the right of vehicle 210.

Given that the physical characteristics of vehicle 210 and that the physical characteristics of each camera, including the position and orientation of each camera, which may be referred to as an extrinsic matrix may be used to map and corelate the position of the camera with the physical characteristics and camera mounting/integration into the vehicle. These characteristics may also include a camera mount of a camera to the vehicle frame or other positioning information. Each camera may also be associated with intrinsic information, or an intrinsic matrix that may include camera and lens information such as focal length information, depth of field, aperture, etc. Accordingly, an extrinsic matrix and intrinsic matrix may be used to map image position information captured by each camera, for example the detection of an object, to a camera plane, or camera image plane, associated with each camera.

Depth ambiguity along a camera's line of sight may tend to be a major challenge for multi-camera top view object detection systems. Typically, the use of three-dimensional detections may lead to multiple false detections, especially for objects with small image footprints such as pedestrians and distant vehicles. As will be discussed, the use of a greedy algorithm that projects a detected object onto one or more input cameras and then computes an affinity score, for example an intersection-over-union (IOU) score, between ranked object pairs while removing one of the paired objects from an updated list of objects where the objects are removed when the affinity is greater than a threshold value. The use of a projection based non-maximum suppress method given that the physical characteristics and orientation/positioning of the cameras to the vehicle are known, such an approach leverages the camera setup and calibration. Thus, the use on non-maximum suppression may suppress the creation of false detection along a camera's line of sight and thus reduce false detections.

The use of a greedy method may be used where, as shown in FIG. 2, where objects are projected to multiple cameras where that object is within the field of view of a camera. Then, in a random, round-robin, or other sequence, each camera within the vehicle may be used using a greedy algorithm to project the objects onto each camera simultaneously and remove objects using a non-maximal suppression approach in two-dimensions-unlike an approach utilizing non-maximal suppression directly on three-dimensional objects in a top view. Thus, the use of projection based two-dimensional non-maximal suppression may be used to resolve object localization ambiguity in a multi-camera object detection setup that is based on the use of a greedy algorithm.

As illustrated in FIG. 2, there may be multiple objects that exist within the fields of view of the multiple vehicle camera's fields of view. In addition, the same physical object may be visible in multiple camera's fields of view. For the purpose of this disclosure, prior to analysis, each image may be treated as an object. Thus, in the example put forth in FIG. 2, field of view 215 from a first camera facing forward may include capturing an image including vehicle 240 and motorcycle 250. Field of view 220 from a second camera facing backwards may include capturing an image including fire hydrant 275 and truck 265. Field of view 225 on the left side of vehicle 210 may include capturing an image including motorcycle 255 and truck 260. And, field of view 230 on the right side of vehicle 210 may include capturing an image including vehicle 245 and fire hydrant 270. As shown in FIG. 2, there may be multiple images of a particular object captured by one or more of the cameras with the goal of keeping the object with the highest detection score.

In an embodiment, the process of eliminating ambiguous object images may be shown by the use of the following pseudo code:

Input=list-of-cameras C and list-of-objects O
Output=Updated list-of-objects O
for camera $c_i$ in C do:
    for object $o_j$ in O do:
        $P_{ij}$←project_on_camera ($c_i$, $o_j$)
    for every pair of objects $p_{ik}$, $p_{il}$ in P such that k≠1:
        $IoU_{kl}$←compute_2d_iou ($p_{ik}$, $p_{il}$)
    for $o_j$ in descending_sort_by_score (O) do:
        if $IoU_{jk}$>TH for any k:
            remove ok from O
Return O As an example, in an embodiment, the above pseudo code may be applied to the example outlined in FIG. 2. For example, the list-of-cameras C may include four cameras, $C_1$ with field of view 215, $C_2$ with field of view 220, $C_3$ with field of view 225, and $C_4$ with field of view 230. The list-of-objects O may include the objects vehicle 240 ($O_1$), vehicle 245 ($O_2$), motorcycle 250 ($O_3$), motorcycle 255 ($O_4$), truck 260 ($O_5$), truck 265 ($O_6$), fire hydrant 270 ($O_7$), and fire hydrant 275 ($O_8$).

The process may start with a first camera, for example camera $C_1$ with field of view 215, where objects that are projected onto the camera plane of camera $C_1$ may include vehicle 240, vehicle 245, motorcycle 250, and motorcycle 255. Note that the image of motorcycle 255 was captured by camera $C_3$ with field of view 225 and that the image of vehicle 245 was captured by $C_4$ with field of view 230.

A listing of the possible object pairs that may be projected onto the image plane of camera $C_1$ may include:
Vehicle 240—Vehicle 245
Vehicle 240—Motorcycle 255
Vehicle 240—Motorcycle 250
Vehicle 245—Vehicle 240
Vehicle 245—Motorcycle 255
Vehicle 245—Motorcycle 250
Motorcycle 250—Motorcycle 255
Motorcycle 250—Vehicle 240
Motorcycle 250—Vehicle 245
Motorcycle 255—Motorcycle 250
Motorcycle 255—Vehicle 240
Motorcycle 255—Vehicle 245

A two-dimensional intersection over union process may be performed on the above object pairs, where for example, those objects that do not overlap would return a zero intersection over union value, which in this example may be considered to be below a set threshold and thus eliminated. Thus, the resulting list of object pairs may be reduced to:
Vehicle 240—Vehicle 245
Vehicle 245—Vehicle 240
Motorcycle 250—Motorcycle 255
Motorcycle 255—Motorcycle 250

Further, by applying a non-maximum suppression method to the pairs, those images that have a detection strength or score greater than a set threshold but less than the maximum image's strength may be deleted. Those deleted objects, e.g., Vehicle 245 and Motorcycle 255, may also be deleted from the list-of-objects O and thus may not need to be further considered.

For purposes of the example in FIG. 2, the smaller pair images may be considered to have a detection strength or score greater than a set threshold but less than the maximum image's strength.

Thus, the remaining objects for the image plane of the first camera $C_1$ with field of view 215 may be reduced, using non-maximal suppression, to:

Vehicle 240; and
Motorcycle 250.

The same process may be applied to the remaining cameras, not necessarily in a particular order. For example, camera $C_2$ with field of view 220 may produce a reduced object list, deleting objects Truck 265 and Fire Hydrant 275 from the list-of-objects O, consisting of:

Truck 260; and
Fire Hydrant 270.

Camera $C_3$ with field of view 225 may produce a reduced object list, as Motorcycle 255 has previously been deleted, of:

Truck 260.

And, camera $C_4$ with field of view 230 may produce a reduced object list, as Vehicle 245 and Fire Hydrant 275 have previously been deleted, of:

Vehicle 240; and
Fire Hydrant 270.

Thus, in this example, the updated list-of-objects O now includes:

Vehicle 240;
Motorcycle 250;
Truck 260; and
Fire Hydrant 270.

Further, the above updated list-of-objects O may also be ranked by each object's detection score.

FIG. 3 illustrates a decision flowchart of a method for multi-camera vehicle top view object detection, according to an embodiment of the present disclosure. In a multi-camera vehicle top view detection system, a target goal of the system may be to identify the location of three-dimensional objects in the field of view of the vehicle. Thus, as shown in step 305, a set of three-dimensional objects may be notated as the object set O that may include up to N objects, shown as objects I=1 through N. Sensors within a vehicle, for example, the camera sensors as described in FIG. 1 and FIG. 2, may produce a detection score associated with each of the objects. For example, a larger object may produce a higher detection score than a smaller object at the same distance. A closer object may also produce a higher detection score than a farther object of the same size. And, as discussed in FIG. 2, a multi-camera vehicle top view object detection system may also utilize multiple cameras, as shown in FIG. 3 as the set of input cameras depicted as ranging from 1 through M. Further, each camera is associated with an extrinsic matrix R and an intrinsic matrix K that map the image plane of each camera given the camera's intrinsic characteristics in addition to the camera's physical location mounting, orientation, etc., with the vehicle and the surrounding environment.

At step 310 given the extrinsic matrix R determined in step 305, the detected three-dimensional set of objects in set O may be transformed to the two-dimensional coordinate frame of each individual camera. For example, as discussed in FIG. 2, objects within the field of vision of each camera may be transformed onto a set of coordinates within each camera given each camera's extrinsic matrix.

At step 315 each set of objects within each camera's field of vision may then be projected onto the image frame of each camera given each camera's intrinsic matrix.

At step 320 a two-dimensional affinity score, for example, an intersection over union score, may be computed between object pairs. Such a computation may be shown as:

$$A_{kl}=IOU(o_k,o_l) \forall o_k,o_l \in O^i \text{ s.t. } k \neq l$$

Akt may represent an affinity score, or as shown in this equation, an intersection over union score between an object pair, notated as $(o_k, o_l)$ for sets of object pairs that are part of that set of objects projected into each camera's field of view. However, the object pair does not include a pair where each member of the pair is the same object.

At step 325 a non-maximal suppression method may be used to eliminate the duplicate object images leaving the object with the highest detection score. This may be accomplished as notated by where $A_{kl}$>TH remove $o_k$ if $s_k \leq s_l$ otherwise remove of from O. The threshold may be predetermined or may be computed within the vehicle based on environmental conditions.

At step 330 the flowchart ascertains that each of the camera views have been processed. The processing of the camera images in steps 310 through 325 may occur sequentially or simultaneously. If processed sequentially, the steps may be performed within a predetermined time frame to ensure that the captured images appear within a desired tolerance range.

At step 335, given that each of the cameras have been processed, the remaining, updated set of objects may be returned.

Figure 4:
FIG. 4 depicts a flowchart of a method for multi-camera vehicle top view object detection, in accordance with the disclosure.

FIG. 4 illustrates a detail flowchart of method 400 for multi-camera vehicle top view object detection, according to an embodiment of the present disclosure. FIG. 4 may begin with step 405 that includes capturing and sending a first video stream of a first field of view of a surrounding environment to a controller from a first outward looking camera within a vehicle. As discussed, a multi-camera vehicle top view system may consist of multiple cameras. In some embodiments, the multiple cameras are positioned to capture a full three-hundred-sixty-degree view of the environment surrounding the vehicle. Accordingly, as shown in step 415, a second outward looking camera is discussed. The method 400 discussed in FIG. 4 is not limited to two cameras as additional cameras are within the scope of this disclosure.

At step 410, upon capturing and sending a video stream from the first camera to a controller, the controller may detect, within that video stream one or more three-dimensional objects within that camera's field of view. Furthermore, the camera may also utilize an extrinsic matrix to associate the captured image with the camera's coordinate frame. In other words, the relationship between the camera's physical position and orientation with that of the vehicle is a known factor. Thus, the captured image, given an extrinsic matrix of the camera may properly align that image with the camera.

At step 415 a second outward looking camera within the vehicle may be used to capture and send a second video stream that includes a second field of view of a surrounding environment to the controller. In some embodiments, the controller may include a separate controller from that of the first outward looking camera but is simply a design choice not meant to change the scope or meaning of this disclosure.

At step 420, the second camera, similar to step 410 with the first camera and the first video stream, upon capturing and sending a video stream from the second camera to a controller, the controller may detect, within that second video stream one or more three-dimensional objects within the second camera's field of view. Furthermore, the field of view of the second outward looking controller may partially overlap the first field of view. In some embodiments therefore, an object may appear in both the first camera's field of view and the second camera's field of view.

At step 425, the method may include transforming and projecting each detected three-dimensional object from the first outward looking camera and each detected three-dimensional object from the second outward looking camera onto a two-dimensional coordinate frame of the first camera and an image plane of the first camera. As discussed in FIG. 3 at step 310, given the extrinsic matrix R as discussed in step 305 of FIG. 3, each of the detected three-dimensional set of objects in set O may be transformed to the two-dimensional coordinate frame of each individual camera. For example, as discussed in FIG. 2, objects within the field of vision of each camera may be transformed onto a set of coordinates within each camera given each camera's extrinsic matrix.

As also discussed in FIG. 3, at step 315, based on a greedy method, where each set of objects within each camera's field of vision may then be projected onto the image frame of each camera given each camera's intrinsic matrix. Thus, as shown in FIG. 2, the first camera's field of view 215 includes projections from the first camera, but also includes projections of the same objects from other cameras, for example the projection of vehicle 245 from camera four and of motorcycle 255 from camera three.

At step 430 the same type of transforming and projecting each detected three-dimensional object from the first outward looking camera and each detected three-dimensional object from the second outward looking camera onto a two-dimensional coordinate frame of the second camera and an image plane of the second camera. Thus, as discussed in FIG. 2, the fourth camera's field of view 230 includes projections from the fourth camera, but also includes projections of the same objects from other cameras, for example the projection of vehicle 245 from camera one and of fire hydrant 275 from camera two.

At step 435 a non-maximal suppression method may be employed to remove objects from the set of detected objects that are secondary images with lower detection scores to produce an updated set of objects that includes objects with the highest detection scores. Thus, for example, step 435 may include computing, for the projected objects to the image plane of the first outward looking camera, a two-dimensional affinity score between each of a pair of detected objects from the first outward looking camera and the second outward looking camera, wherein if the affinity score for the object in each of the pair of detected objects is greater than a threshold amount, that object is removed from a list of ranked detected objects. As discussed in FIG. 3, the two-dimensional affinity score mechanism may include an intersection over union analysis. As discussed in step 320 of FIG. 3, a two-dimensional affinity score, for example, an intersection over union score, may be computed between each of the object pairs. Such a computation may be shown as:

$$A_{kl}=IOU(o_k,o_l) \forall o_k, o_l \in O^j \text{ s.t. } k \neq l$$

$A_{kl}$ may represent an affinity score, or as shown in this equation, an intersection over union score between an object pair, notated as $(o_k, o_l)$ for the sets of object pairs that are part of that set of objects projected into each camera's field of view. However, the object pair does not include a pair where each member of the pair is the same object. Then, as discussed in step 325 a non-maximal suppression method may be used to eliminate duplicate object images leaving the object with the highest detection score. This may be accomplished as notated by where for each of the $A_{kl}$>TH remove $o_k$ if $s_k<s_l$ otherwise remove o from O.

Step 440 may include computing, for the projected objects to the image plane of the second outward looking camera, a two-dimensional affinity score between each of a pair of detected objects from the first outward looking camera and the second outward looking camera, wherein if the affinity score for an object in each of the pair of detected objects is greater than a threshold amount, that object is removed from a list of ranked detected objects.

Then, at step 445, given that each of the camera's video streams have been processed an updated list of ranked detected objects may be produced. For example, as discussed with FIG. 2, the original list-of-objects O may include the objects vehicle 240 ($O_1$), vehicle 245 ($O_2$), motorcycle 250 ($O_3$), motorcycle 255 ($O_4$), truck 260 ($O_5$), truck 265 ($O_6$), fire hydrant 270 ($O_7$), and fire hydrant 275 ($O_8$) where the updated list list-of-objects O included only objects vehicle 240 ($O_1$), motorcycle 250 ($O_3$), truck 260 ($O_5$), and fire hydrant 270 ($O_7$).

Method 400 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system for multi-camera vehicle top view object detection comprising:
   a first outward looking camera, situated in a vehicle, configured to capture and send a first video stream of a first field of view of a surrounding environment to a controller, wherein the controller, based on the first video stream, is configured to detect one or more three-dimensional objects within the first field of view, wherein the first outward looking camera is associated with a first camera coordinate frame;
   a second outward looking camera, situated in the vehicle, configured to capture and send a second video stream of a second field of view of a surrounding environment to the controller, wherein the controller, based on the second video stream, is configured to detect one or more three-dimensional objects within the second field of view, wherein the second outward looking camera is associated with a second camera coordinate frame, and wherein the second field of view partially overlaps the first field of view;
   the controller further configured, for the first camera, to transform and project each detected three-dimensional object from the first outward looking camera and each detected three-dimensional object from the second outward looking camera, onto a two-dimensional coordinate frame of the first camera and an image plane of the first camera;
   the controller further configured, for the second camera, to transform and project each detected three-dimensional object from the first outward looking camera and each detected three-dimensional object from the second outward looking camera, onto a two-dimensional coordinate frame of the second camera and a two-dimensional image plane of the second camera;
   the controller further configured, for the projected objects to the image plane of the first outward looking camera, to compute a ranked two-dimensional affinity score between each of a pair of detected objects from the first outward looking camera and the second outward looking camera, wherein if the affinity score for any object in each of the pair of detected objects is greater than a threshold amount, that object is removed from a list of ranked detected objects;
   the controller further configured, for the projected objects to the image plane of the second outward looking camera, to compute a ranked two-dimensional affinity score between each of a pair of detected objects from the first outward looking camera and the second outward looking camera, wherein if the affinity score for any object in each of the pair of detected objects is greater than a threshold amount, that object is removed from a list of ranked detected objects; and
   the controller further configured, to output the list of ranked detected objects;
   wherein the controller is further configured to project each detected three-dimensional object from the first outward looking camera, onto the image plane of the first camera based on an intrinsic matrix of the first outward looking camera; and
   wherein the controller is further configured to project each detected three-dimensional object from the second outward looking camera, onto the image plane of the second camera based on an intrinsic matrix of the second outward looking camera.

2. The system of claim 1, wherein the two-dimensional affinity score is based on an intersection over union process.

3. The system of claim 1 wherein if the second outward looking camera fails to detect a three-dimensional object by the first outward looking camera, then the controller is configured to not compute a two-dimensional affinity score.

4. The system of claim 1, wherein the two-dimensional affinity score is based upon a distance and size difference between each pair of detected objects.

5. The system of claim 1, wherein the controller is further configured to transform each detected three-dimensional object from the first outward looking camera, onto the two-dimensional coordinate frame of the first camera based on an extrinsic matrix of the first outward looking camera.

6. The system of claim 1, wherein the controller is further configured to transform each detected three-dimensional object from the second outward looking camera, onto the two-dimensional coordinate frame of the second camera based on an extrinsic matrix of the second outward looking camera.

7. The system of claim 1, wherein the computing a two-dimensional affinity score is based upon the use of a greedy algorithm.

8. The system of claim 1, wherein the detected object is removed from the list of ranked detected objects based on a non-maximum suppression method.

9. A method for multi-camera vehicle top view object detection comprising:
   capturing and sending a first video stream of a first field of view of a surrounding environment to a controller from a first outward looking camera, situated in a vehicle;
   detecting, based on the first video stream, one or more three-dimensional objects within the first field of view, wherein the first outward looking camera is associated with a first camera coordinate frame;
   capturing and sending a second video stream of a second field of view of a surrounding environment to a controller from a second outward looking camera, situated in the vehicle;
   detecting, based on the second video stream, one or more three-dimensional objects within the second field of view, wherein the second outward looking camera is associated with a second camera coordinate frame, and wherein the second field of view partially overlaps the first field of view;
   transforming and projecting each detected three-dimensional object from the first outward looking camera and each detected three-dimensional object from the second outward looking camera onto a two-dimensional coordinate frame of the first camera and an image plane of the first camera;
   transforming and projecting each detected three-dimensional object from the first outward looking camera and each detected three-dimensional object from the second outward looking camera onto a two-dimensional coordinate frame of the second camera and an image plane of the second camera;
   computing, for the projected objects to the image plane of the first outward looking camera, a ranked two-dimensional affinity score between each of a pair of detected objects from the first outward looking camera and the second outward looking camera, wherein if the affinity score for any object in each of the pair of detected objects is greater than a threshold amount, that object is removed from a list of ranked detected objects;
   computing, for the projected objects to the image plane of the second outward looking camera, a two-dimensional affinity score between each of a pair of detected objects from the first outward looking camera and the second outward looking camera, wherein if the affinity score for any object in each of the pair of detected objects is greater than a threshold amount, that object is removed from the list of ranked detected objects; and outputting the list of ranked detected objects;

wherein the projecting each detected three-dimensional object from the first outward looking camera, onto the image plane of the first camera is based on an intrinsic matrix of the first outward looking camera; and wherein the projecting each detected three-dimensional object from the second outward looking camera, onto the image plane of the second camera is based on an intrinsic matrix of the second outward looking camera.

10. The method of claim 9, wherein computing of the two-dimensional affinity score is based on an intersection over union process.

11. The method of claim 9, further comprising ceasing to compute a two-dimensional affinity score for a detected particular three-dimensional object from the first outward looking camera if the second outward looking camera fails to detect the particular three-dimensional object.

12. The method of claim 9, wherein the computing the two-dimensional affinity score is based upon a distance and size difference between each pair of detected objects.

13. The method of claim 9, wherein the transforming each detected three-dimensional object from the first outward looking camera, onto the two-dimensional coordinate frame of the first camera is based on an extrinsic matrix of the first outward looking camera.

14. The method of claim 9, wherein the transforming each detected three-dimensional object from the second outward looking camera, onto the two-dimensional coordinate frame of the second camera is based on an extrinsic matrix of the second outward looking camera.

15. The method of claim 9, wherein the removing the detected object is removed from the list of ranked detected objects based on a non-maximum suppression method.

16. A method for multi-camera vehicle top view object detection comprising:

capturing and sending a first video stream of a first field of view of a surrounding environment to a controller from a first outward looking camera, situated in a vehicle;

detecting, based on the first video stream, one or more three-dimensional objects within the first field of view, wherein the first outward looking camera is associated with a first camera coordinate frame;

capturing and sending a second video stream of a second field of view of a surrounding environment to a controller from a second outward looking camera, situated in the vehicle;

detecting, based on the second video stream, one or more three-dimensional objects within the second field of view, wherein the second outward looking camera is associated with a second camera coordinate frame, and wherein the second field of view partially overlaps the first field of view;

transforming, based on an extrinsic matrix of the first outward looking camera, and projecting, based on an intrinsic matrix of the first outward looking camera, each detected three-dimensional object from the first outward looking camera and the second outward looking camera onto a two-dimensional coordinate frame of the first outward looking camera and an image plane of the first outward looking camera;

transforming, based on an extrinsic matrix of the second outward looking camera, and projecting, based on an intrinsic matrix of the second outward looking camera, each detected three-dimensional object from the first outward looking camera and the second outward looking camera onto a two-dimensional coordinate frame of the second camera and an image plane of the second camera;

computing, for the projected objects to the image plane of the first outward looking camera, a two-dimensional affinity score, based on an intersection over union process, between each of a pair of detected objects from the first outward looking camera and the second outward looking camera, wherein if the affinity score for any object in each of the pair of detected objects is greater than a threshold amount, that object is removed, based on a non-maximum suppression method, from a list of ranked detected objects;

computing, for the projected objects to the image plane of the second outward looking camera, a two-dimensional affinity score, based on an intersection over union process, between each of a pair of detected objects from the first outward looking camera and the second outward looking camera, wherein if the affinity score for any object in each of the pair of detected objects is greater than a threshold amount, that object is removed, based on a non-maximum suppression method, from the list of ranked detected objects; and outputting the list of ranked detected objects;

wherein the projecting each detected three-dimensional object from the first outward looking camera, onto the image plane of the first camera is based on an intrinsic matrix of the first outward looking camera; and wherein the projecting each detected three-dimensional object from the second outward looking camera, onto the image plane of the second camera is based on an intrinsic matrix of the second outward looking camera.

17. The method of claim 16, wherein computing of the two-dimensional affinity score is based on an intersection over union process.

18. The method of claim 16, further comprising ceasing to compute a two-dimensional affinity score for a detected particular three-dimensional object from the first outward looking camera if the second outward looking camera fails to detect the particular three-dimensional object.

19. The method of claim 16, wherein the computing the two-dimensional affinity score is based upon a distance and size difference between each pair of detected objects.

20. The method of claim 16, wherein the transforming each detected three-dimensional object from the first outward looking camera, onto the two-dimensional coordinate frame of the first camera is based on an extrinsic matrix of the first outward looking camera.

* * * * *